(12) United States Patent
Passarotto

(10) Patent No.: US 7,140,695 B2
(45) Date of Patent: Nov. 28, 2006

(54) LIGHTENED RIM FOR A BICYCLE WHEEL AND METHOD FOR MANUFACTURING SUCH A RIM

(75) Inventor: Maurizio Passarotto, Rovigo (IT)

(73) Assignee: Campagnolo S.r.l., Vicenza (IT)

( * ) Notice: Subject to any disclaimer, the term of this patent is extended or adjusted under 35 U.S.C. 154(b) by 85 days.

(21) Appl. No.: 10/877,024

(22) Filed: Jun. 25, 2004

(65) Prior Publication Data

US 2005/0017569 A1 Jan. 27, 2005

(30) Foreign Application Priority Data

Jun. 26, 2003 (EP) .................................. 03425419

(51) Int. Cl.
*B60B 21/02* (2006.01)
*B60B 21/06* (2006.01)

(52) U.S. Cl. .................................... 301/58; 301/95.108
(58) Field of Classification Search ................. 301/55, 301/58, 95.101, 95.104, 95.106, 95.107, 301/95.108

See application file for complete search history.

(56) References Cited

U.S. PATENT DOCUMENTS

| 395,523 | A | * | 1/1889 | Taylor ........................ 301/79 |
| 452,649 | A | | 5/1891 | Powell |
| 521,385 | A | * | 6/1894 | Mosely ................... 301/95.101 |
| 759,124 | A | * | 5/1904 | Oswald ........................ 301/58 |
| 1,286,065 | A | * | 11/1918 | Murray ........................ 301/58 |
| 1,393,797 | A | * | 10/1921 | Lachman ..................... 301/66 |
| 1,402,003 | A | * | 1/1922 | Miller ........................ 301/29.2 |
| 6,367,883 | B1 | * | 4/2002 | Chen ............................ 301/55 |
| 6,402,256 | B1 | * | 6/2002 | Mercat ................... 301/95.104 |
| 6,425,641 | B1 | * | 7/2002 | Herting ........................ 301/58 |

FOREIGN PATENT DOCUMENTS

| EP | 0715001 | 6/1996 |
| EP | 1 084 868 | 9/1997 |
| EP | 1 314 579 | 9/2000 |
| FR | 833.629 | 6/1937 |
| FR | 2765150 | 6/1997 |
| JP | 60275078 | 9/1985 |
| WO | WO 93/09963 | 11/1992 |

* cited by examiner

*Primary Examiner*—Russell D. Stormer
(74) *Attorney, Agent, or Firm*—Volpe and Koenig, P.C.

(57) ABSTRACT

A rim for a bicycle has a lower bridge with infra-spoke zones of lower thickness than the thickness of the spoke attachment zones. The increase in thickness from the infra-spoke zones to the spoke attachment zones and the reduction in thickness between the spoke attachment zones and the infra-spoke zones have a sharp corner.

25 Claims, 10 Drawing Sheets

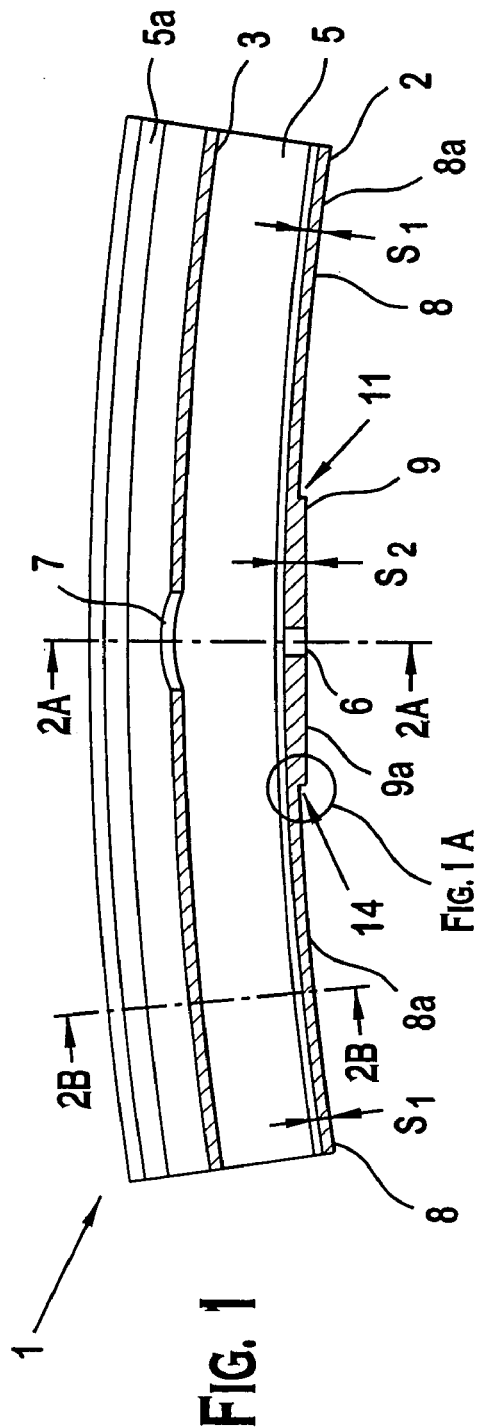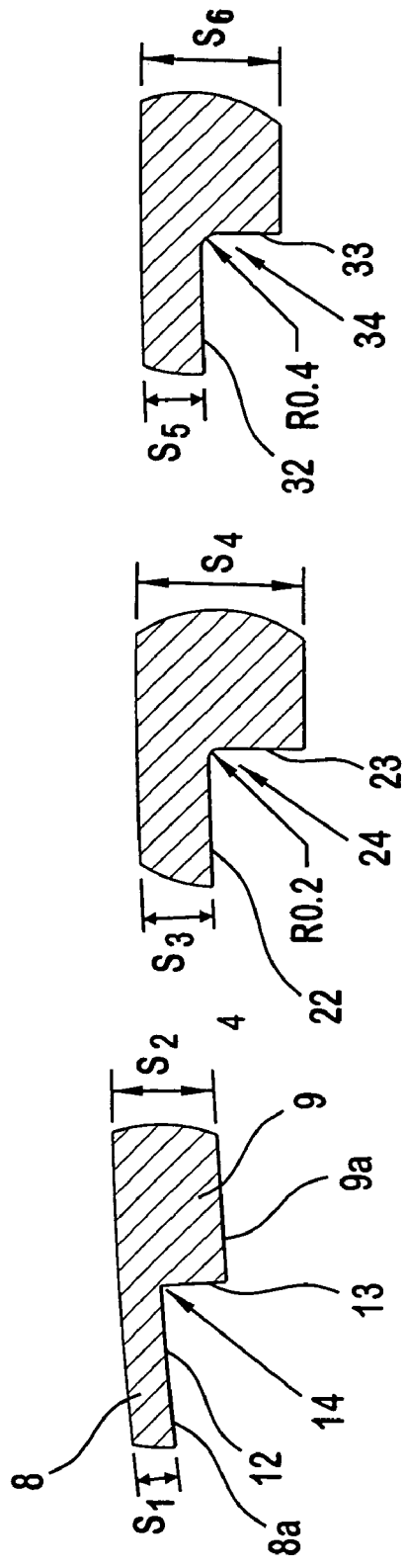

LIGHTENED RIM FOR A BICYCLE WHEEL AND METHOD FOR MANUFACTURING SUCH A RIM

BACKGROUND

Bicycle wheels usually comprise a peripheral crown or rim, a central hub, and a plurality of spokes that connect the hub to the rim. Rims are generally made up of two side walls connected or jointed at one end by a circumferentially inner wall or lower bridge and at an intermediate point by a circumferentially outer wall or upper bridge. This arrangement gives the rim a substantially upside down A-shaped cross-section. The circumferentially outer portions of the side walls, typically have an outer edge that forms a channel for coupling with a tire, whereas the circumferentially inner portions of the side walls form, together with the lower bridge and the upper bridge, a chamber for the attachment of the spokes.

The spokes are attached to seats in the lower bridge or in the inner side walls. The seats generally consist of openings, smooth holes, or threaded holes depending on the method used for the attachment of the spokes.

Rims are manufactured by extruding aluminum alloy bars. The bar is shaped as a circle typically by calendering and its top ends are jointed by welding.

In the field of bicycles, especially in the field of racing bicycles, a common goal is to reduce the weight of a wheel, and in particular a rim, without diminishing its structural strength and static and dynamic stability. Other solutions seek simple and less expensive manufacturing processes that produce aesthetically pleasing and original shapes.

In rim design, it is commonly known that the rim is in the most tension in the (areas of the spoke attachment zones and this tension progressively decreases moving away from such zones. With the goal of reducing the weight of the rim, rim designs may have a greater thickness where the tensions are greater, i.e. in the spoke attachment zones, and a lower thickness where the tensions are lower, i.e. in the zones between the spoke attachment zones (the "infra-spoke zones").

Several solutions to this problem have been designed: a first known solution to the problem of rim design is described in U.S. Pat. No. 452,649 to Powell; a second solution in patent application PCT WO93/09963; a third solution in European patent EP 715,001; and a fourth solution in European patent EP 1,084,868.

In particular, PCT WO93/09963 obtains the two different thicknesses of the rim (in the spoke attachment zones and in the infra-spoke zones) starting from a rim having a lower bridge with the desired minimum thickness and thickening the spoke attachment zones with a drawing mechanical process. In European patents EP 715,001 and EP 1,084,868, by contrast, the two thicknesses start from a rim with a thickness of the lower bridge substantially equal to that desired in the spoke attachment zones and then material is removed (by chemical processing in EP 715,001 and by mechanical processing in EP 1,084,868) in the infra-spoke zones of the lower bridge.

In all the known solutions, the variations in thickness between the spoke attachment zones and the infra-spoke zones have a transition zone with a substantially curvilinear progression and different radii of curvature which range from a minimum of a few millimeters in EP 715,001 to a maximum of 100 mm in EP 1,084,868. As explained in EP 1,084,868, the progression of such a transition zone is "required" because the tensions introduced by the spokes in the rim are distributed in the rim itself with gradual progressions and "sudden" variations in thickness would lead to concentrations of tensions in the rim and, therefore, to its breaking generally by fatigue.

Moreover, such a requirement is thought of as common knowledge to people skilled in the art, who know that in order to distribute tensions, it is necessary to provide soft and gradual variations in cross-section in order to avoid point stresses.

A drawback of the known solutions is that the curvilinear progression of the variation in thickness does not allow for as great a removal of material, thus leading to a reduction in the weight of a rim not completely satisfactory. Moreover, such a curvilinear progression also defines the shape that must be given to the variation in thickness.

SUMMARY

Contrary to what was previously known, it has been found that tensions of the spokes can be distributed in a rim with sudden variations in thickness and with very small transition zones. This reduces the rim's weight more than in known solutions without adversely impacting the structural strength and static and dynamic stability of the wheel. Moreover, these sudden variations in thickness allow different processing techniques to be used and give a wide freedom of choice on the "form" to be given to such variations in thickness.

A rim for a bicycle wheel formed of an annular profile, the section of which comprises a lower bridge and side walls, the lower bridge or the side walls comprises spoke attachment zones and infra-spoke zones. The spoke attachment zones have a predetermined thickness with seats arranged for the attachment of spokes. The infra-spoke zones have a thickness less than the thickness of the spoke attachment zones and the infra-spoke zones are located between the spoke attachment zones. The spoke attachment zones and the infra-spoke zones are joined by portions of the rim that span the difference in thickness between the spoke attachment zones and the infra-spoke attachment zones and have a sharp progression.

BRIEF DESCRIPTION OF THE DRAWING(S)

Further characteristics and advantages of the invention shall become clearer from the description of some preferred embodiments, given with reference to the attached drawings, where:

FIG. 1 shows a longitudinal section of a segment of the rim for wheels with an inner tube;

FIG. 1A shows an enlarged detail of FIG. 1;

FIGS. 1B and 1C show various embodiments of the enlarged detail of FIG. 1A;

Figure 11:
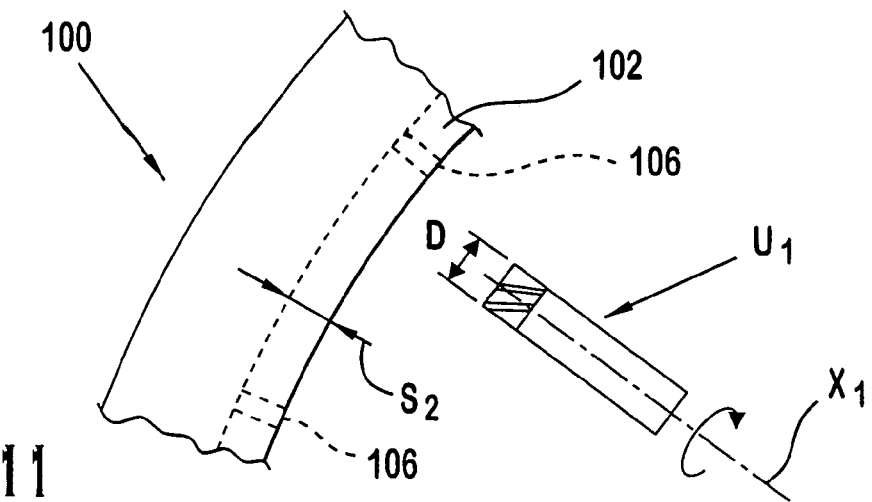
Figure 12:
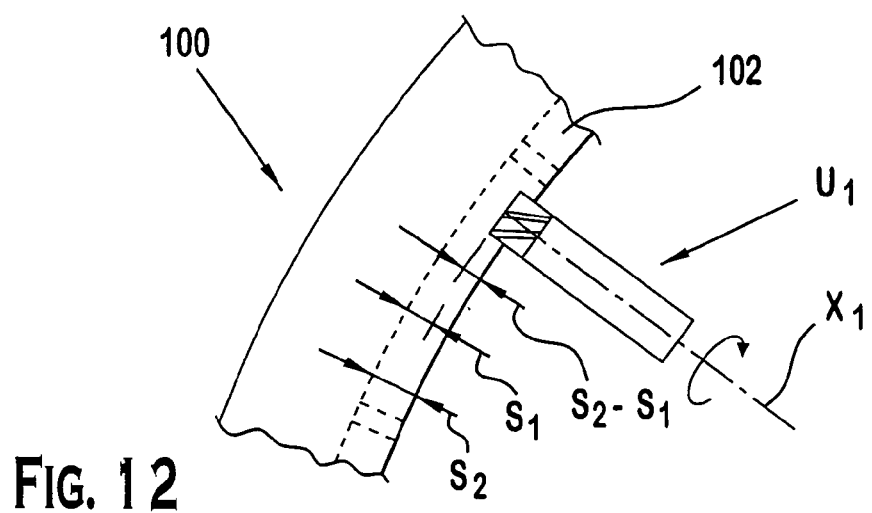
Figure 13:
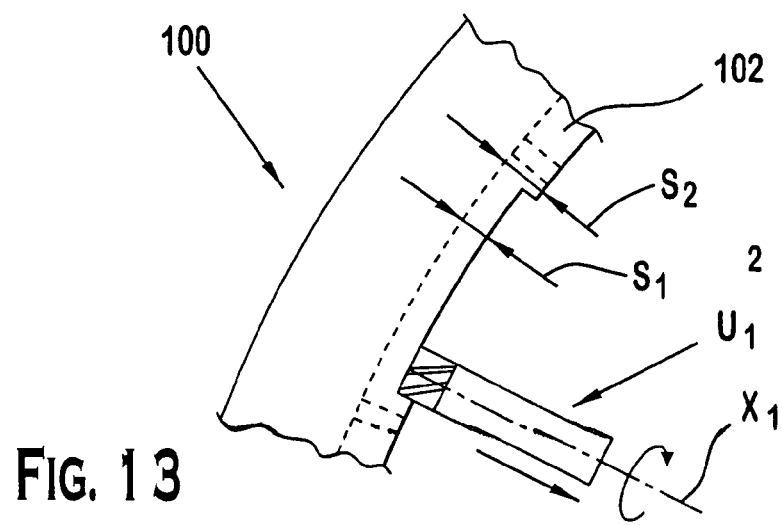
Figure 14:
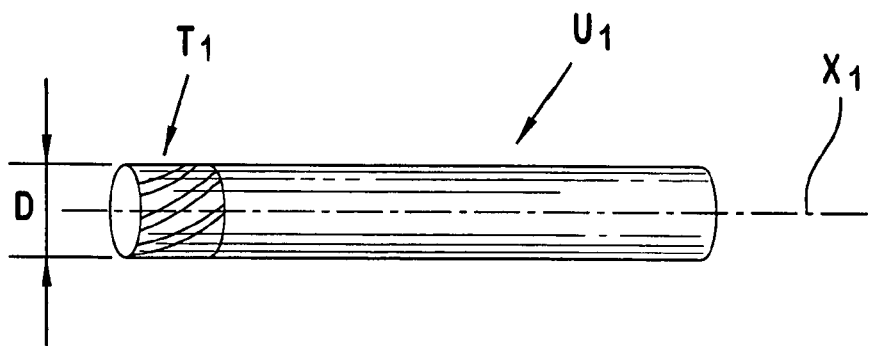
Figure 15:
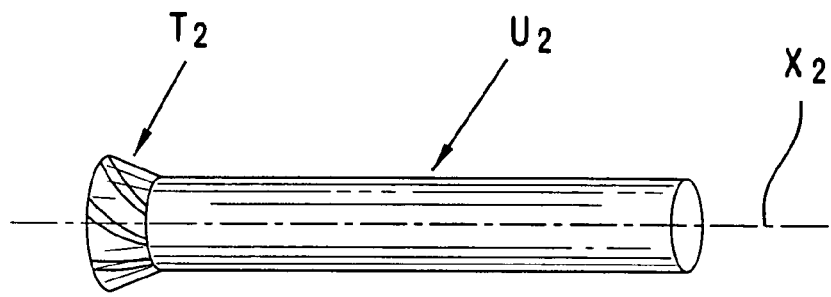
Figure 16:
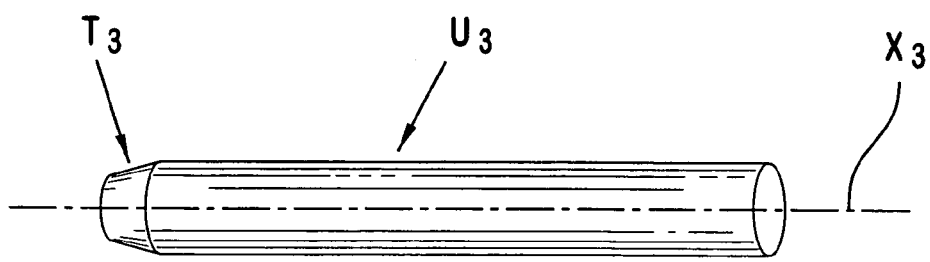

FIGS. 11 to 13 schematically show some steps of a method for manufacturing the rim;

FIGS. 14 to 16 show different types of tools used to obtain different types of rims using the method shown in FIGS. 11 to 13.

DETAILED DESCRIPTION OF THE PREFERRED EMBODIMENT(S)

Figure 9:
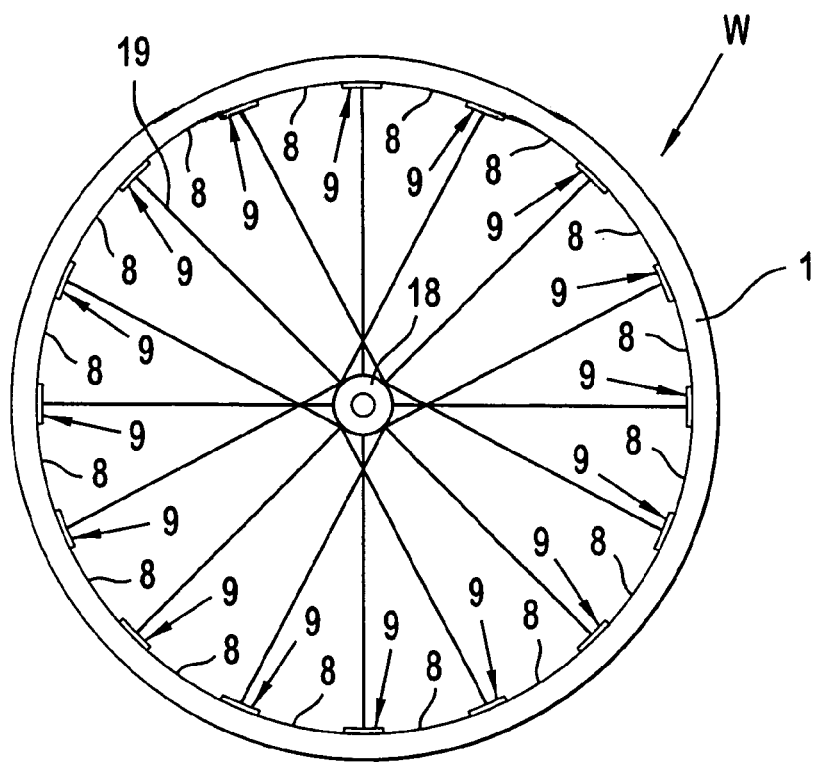
FIG. 9 shows a side view of a wheel using the rim.
Figure 10:
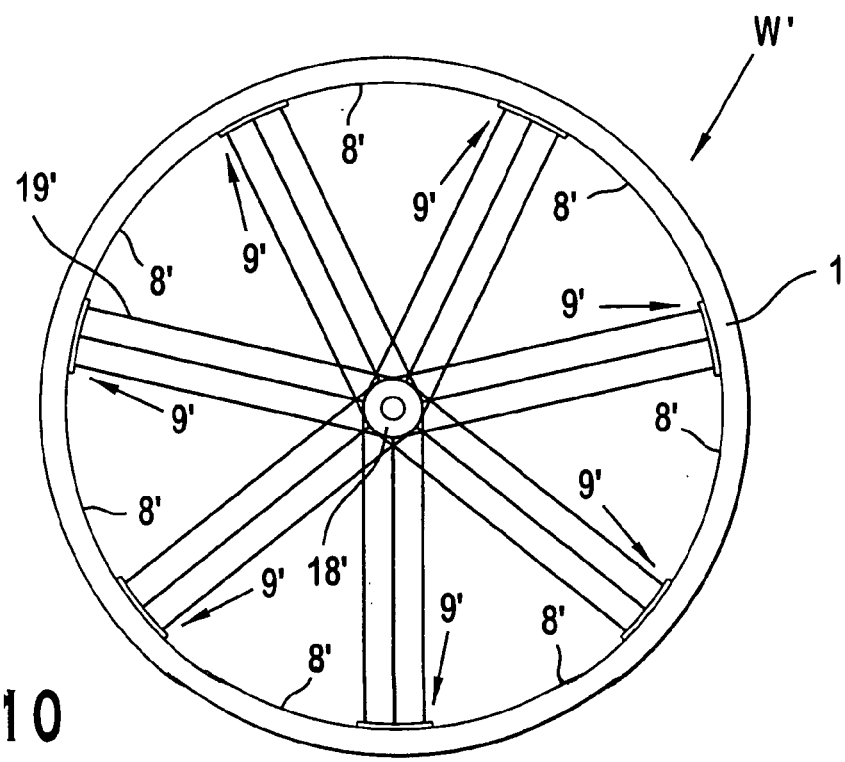
FIG. 10 shows a side view of another type of wheel using the rim.

The rim 1 shown in FIG. 1 is manufactured by extrusion of an aluminum alloy bar. The bar is formed as a circle and joined at its ends typically by welding. FIGS. 9 and 10 show the rim 1 attached to two bicycle wheels W, W' with different spoke arrangements. The bicycle wheels W, W' are formed by a peripheral crown with an annular profile or rim 1, a central hub 18, 18' and a plurality of spokes 19, 19' which connect the hub 18, 18' to the rim 1. FIG. 1 shows a segment of such a rim 1 longitudinally sectioned, whereas FIGS. 2A and 2B show cross-sections of the rim of FIG. 1.

Figure 2A:
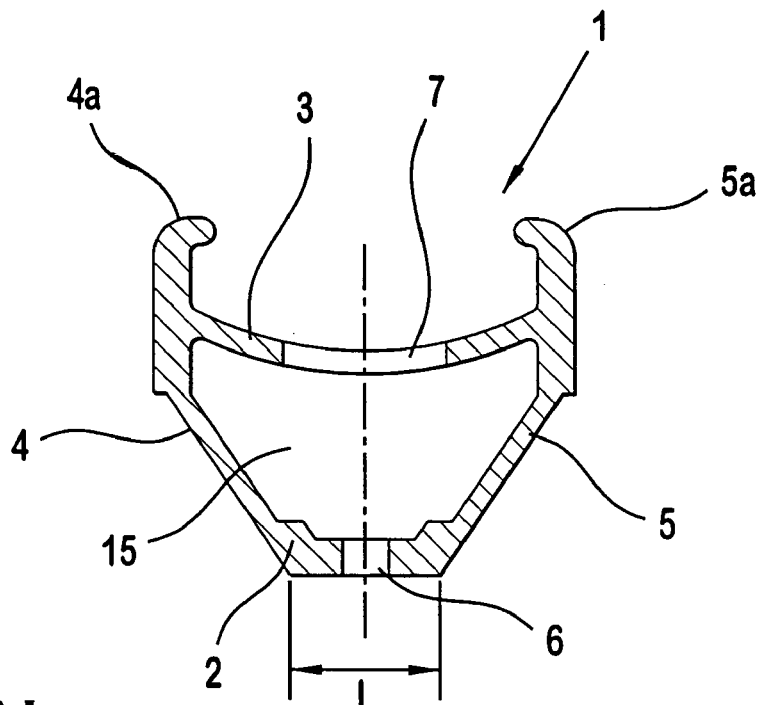
FIG. 2A shows a cross-section of the rim of the plane 2A—2A of FIG. 1.
Figure 2B:
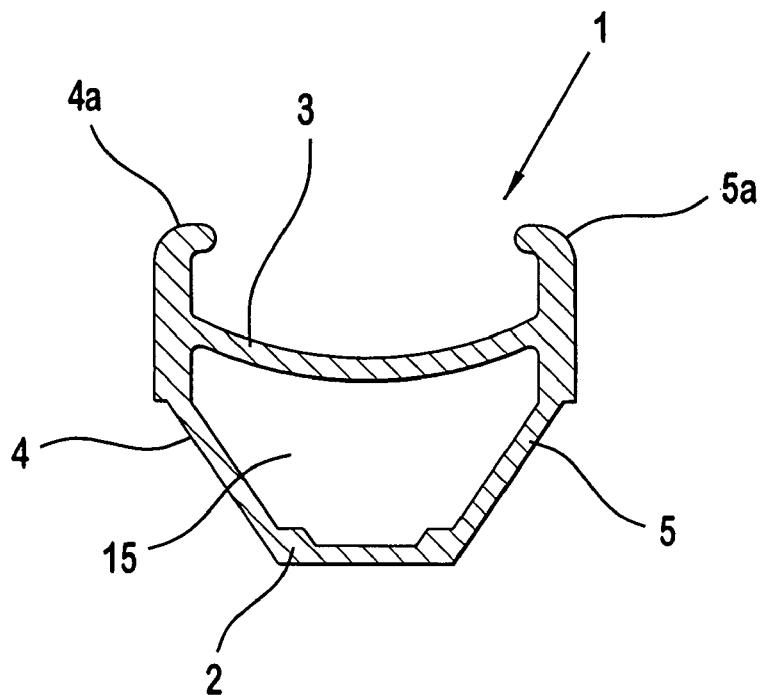
FIG. 2B shows a cross-section of the rim of the plane 2B—2B of FIG. 1.

The rim 1, as is best seen in FIGS. 2A and 2B, is made up of two side walls 4, 5 connected at one end by a circumferentially inner wall 2, known as lower bridge, and at an intermediate point by a circumferentially outer wall 3, also known as upper bridge, and has a substantially upside down A-shaped cross-section. The circumferentially outer portions of the side walls 4, 5 have an outer edge 4a, 5a that forms a channel for coupling with the tire, whereas the circumferentially inner portions of the side walls 4, 5 form, with the lower bridge 2 and the upper bridge 3, a chamber 15 for the attachment of the spokes.

The lower bridge 2 or side walls 4, 5 also have spoke attachment zones 9 of constant thickness S2 (enlarged in FIG. 1A) preferably of about 1.8 mm where through holes 6 (see FIG. 1) are formed for the attachment of the spokes. To ease attachment of the spokes, the upper bridge 3 has a through hole 7 with a diameter greater than the diameter of the hole 6 of the lower bridge 2 radially aligned with it. Such a construction makes the assembly operations of the spokes during the manufacturing of the wheel easier than it otherwise would be.

During assembly, the hole 7 of the upper bridge 3 allows the introduction of a nut or locking nipple which engages the threaded head of the spokes inserted radially from the center of the rim into the hole 6 of the lower bridge 2. The size of the hole 7, moreover, is large enough to accommodate a tool for screwing the nut or the nipple into the head of the spoke.

The lower bridge 2 or side walls 4, 5 also have, between the spoke attachment zones 9, infra-spoke zones 8 of substantially constant thickness S1 that are preferably about 0.8 mm thick. The decreased thickness of the infra-spoke zones 8, with respect to the thickness of the spoke attachment zones 9, reduces the weight of the rim 1 and therefore of the wheel W. The reduction in thickness does not, however, substantially diminish the structural strength, the static stability, and the dynamic stability of the wheels since the thickness is reduced outside the zones 9 where the tensions are greater. These thinner zones do, however, have a thickness Si sufficient to ensure adequate structural strength within the rim.

The thicknesses S1 and S2 in the embodiment shown are substantially uniform in their respective zones along the annular extension of the rim, but in different embodiments a variation thereof can be foreseen to define surfaces with a slightly concave or convex curvilinear profile.

The increase in thickness between the infra-spoke zone 8 and the spoke attachment zone 9, better shown in the enlarged detail of FIG. 1A, has a sharp thickness change with a corresponding sharp corner 14. In the same way, the decrease in thickness between the spoke attachment zone 9 and the infra-spoke zone 8, as can be seen from FIG. 1, has also a sharp thickness change with a corresponding sharp corner 11.

A first rectilinear portion 13 is substantially perpendicular to the inner surface 8a of the infra-spoke zone 8. A second curvilinear portion 12, having a radius of curvature substantially equal to the radium of the lower bridge 2 of the rim 1, intersects the first rectilinear portion 13 forming a substantial right-angle or sharp corner 14. The increase and decrease in thickness have a substantially "stepped" shape and are sharp, which substantially eliminates a transition zone between the two different thicknesses. The angle formed between the two portions 12 and 13 is not necessarily 90°, but can be slightly more or less than 90°. Moreover, the first portion 13 and the second portion 12 can have a slight concavity or convexity, or any combination between a rectilinear, concave or convex shape owing to the circular shape.

Although FIG. 1A shows the embodiment where the first portion 13 and the second portion 12 intersect with each other forming a substantially perpendicular corner 14, such a sharp intersection may be difficult to produce. For example, FIG. 1C shows a first possible configuration that can be obtained with known processing techniques, where the intersection zone, or corner 34 between the first portion 33 and the second portion 32 has a radius of curvature of about 0.4 mm. Similarly, a second configuration is shown in the enlarged detail of FIG. 1B, where the intersection zone, or corner 24 between the first portion 23 and the second portion 22 has a radius of curvature of about 0.2 mm.

Throughout the present application, corner means not only a perpendicular intersection zone between the second portion 12, 22, 32 and the first portion 13, 23, 33 but an intersection zone having a radius of curvature of about up to 0.4 mm but preferably having a radius of curvature of up to about 0.2 mm.

FIGS. 1B and 1C show different embodiments with respect to the thicknesses of the spoke attachment 9 and infra-spokes 8 zones. FIG. 1B shows the rim with a lower bridge thickness S4 in the spoke attachment zone of about 2.9 mm and a thickness S3 in the infra-spoke zone of about 1.2 mm. FIG. 1C shows a rim with a lower bridge thickness S6 in the spoke attachment zone of about 2.3 mm and a thickness S5 in the infra-spoke zone of about 1 mm.

Figure 3:
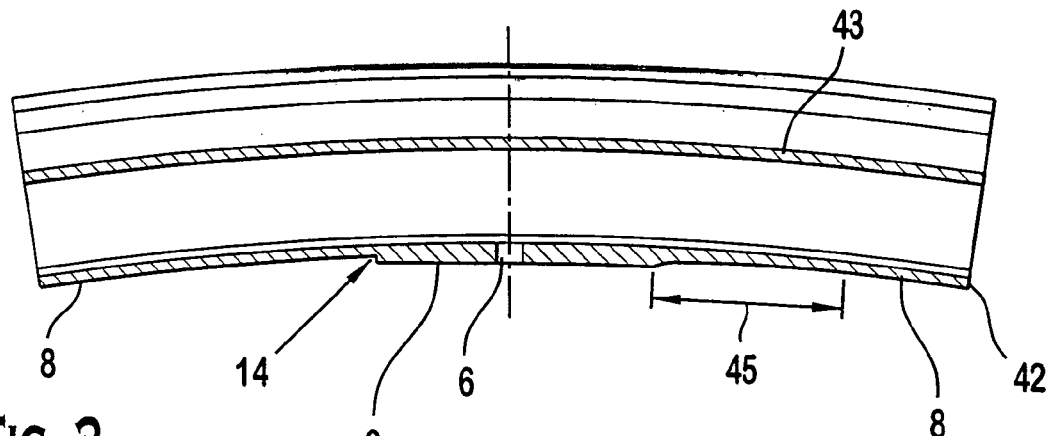
FIG. 3 shows a longitudinal section of a portion of a rim for use with tubeless wheels.

FIG. 3 shows an embodiment of the rim where the upper bridge 43 has no holes (as opposed to the holes 7 in FIG. 1). This lack of holes in the upper bridge makes the rim suitable for use with tubeless wheels. In this embodiment, the holes 6 in the lower bridge 42 for the attachment of the spokes may be either smooth or threaded.

For the embodiment shown in FIG. 3, the lower bridge 42 increases in thickness between the infra-spoke zone 8 and the spoke attachment zone 9 at a sharp corner 14 of the type shown in FIG. 1. The lower bridge 42 also has a decrease in thickness between the spoke attachment zone 9 and the infra-spoke zone 8 with a curvilinear gradual progression that extends along the length of a portion 45 of the rim 1.

Figure 4:
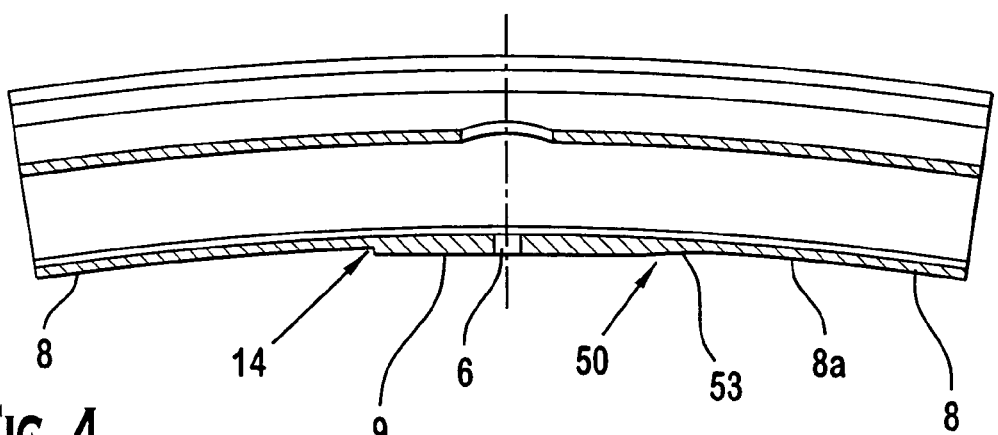
FIG. 4 shows a longitudinal section of a portion of an alternate embodiment of the rim.

FIG. 4 shows a similar embodiment to the one shown in FIG. 3, but where the decrease in thickness 50 between the spoke attachment zone 9 and the infra-spoke zone 8 has a rectilinear gradual progression that extends along the length of a portion 53 of the rim 1.

With reference to FIGS. 3 and 4, certain advantages may arise from a rim with an increase in thickness along a curvilinear gradual progression or rectilinear gradual progression and also a decrease in thickness at a sharp corner.

Figure 5:
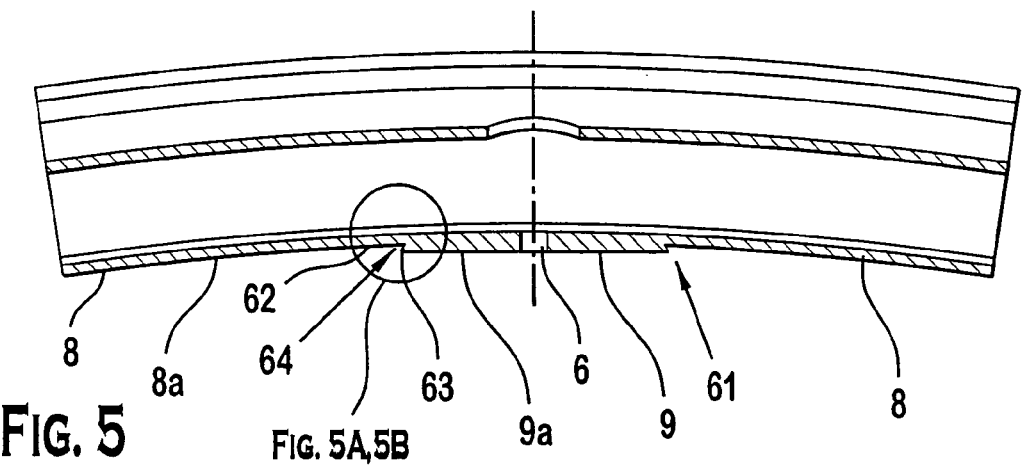
FIG. 5 shows another longitudinal section of a portion of an alternate embodiment of the rim.
Figure 5A:
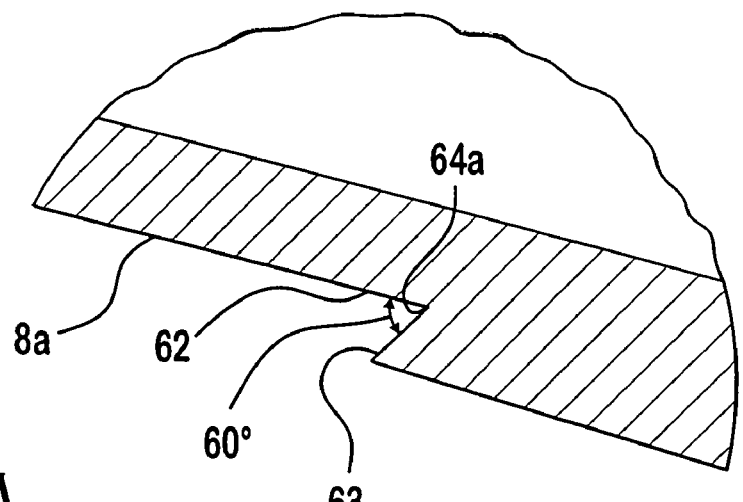
FIG. 5A shows an enlargement of the area 5A, 5B noted in FIG. 5.
Figure 5B:
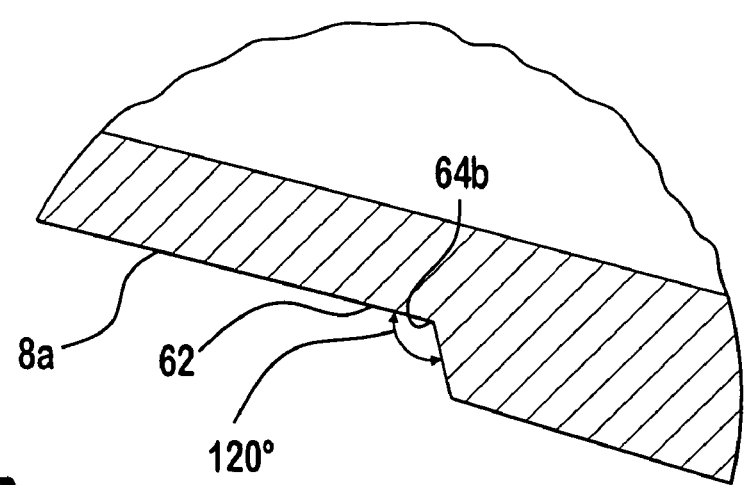
FIG. 5B shows an enlargement of an alternate embodiment of the area 5A, 5B noted in FIG. 5.

FIG. 5 shows a segment of another embodiment of the rim with an increase in thickness from the infra-spoke zone 8 to the spoke attachment zone 9 and a decrease in thickness from the spoke attachment zone 9 to the infra-spoke zone 8. The increase in thickness comprises a second rectilinear portion 62 substantially tangent to the inner surface 8a of the infra-spoke zone 8, and a first rectilinear portion 63, substantially at 60° with respect to the second portion 62 and an undercut acute angle or sharp corner 64a of about 60°. FIG. 5A shows this 60° corner 64a in more detail. FIG. 5B shows an alternate embodiment of the area of the rim 10 where the increase in thickness occurs. Namely, in FIG. 5B, the increase in thickness comprises a second rectilinear portion 62 substantially tangent to the inner surface 8a of the infra-spoke zone 8, and a first rectilinear portion 63, substantially at 120° with respect to the second portion 62 and an obtuse angle or sharp corner 64b of about 120 °.

The 60° and 120° angles are only some of the many possible angle values and this angle can be larger or smaller as may be required in a design. Moreover, the sharp corner 64a, 64b has a radius of curvature preferably equal to or less than about 0.4 mm and even more preferably equal to or less than about 0.2 mm.

Figure 5C:
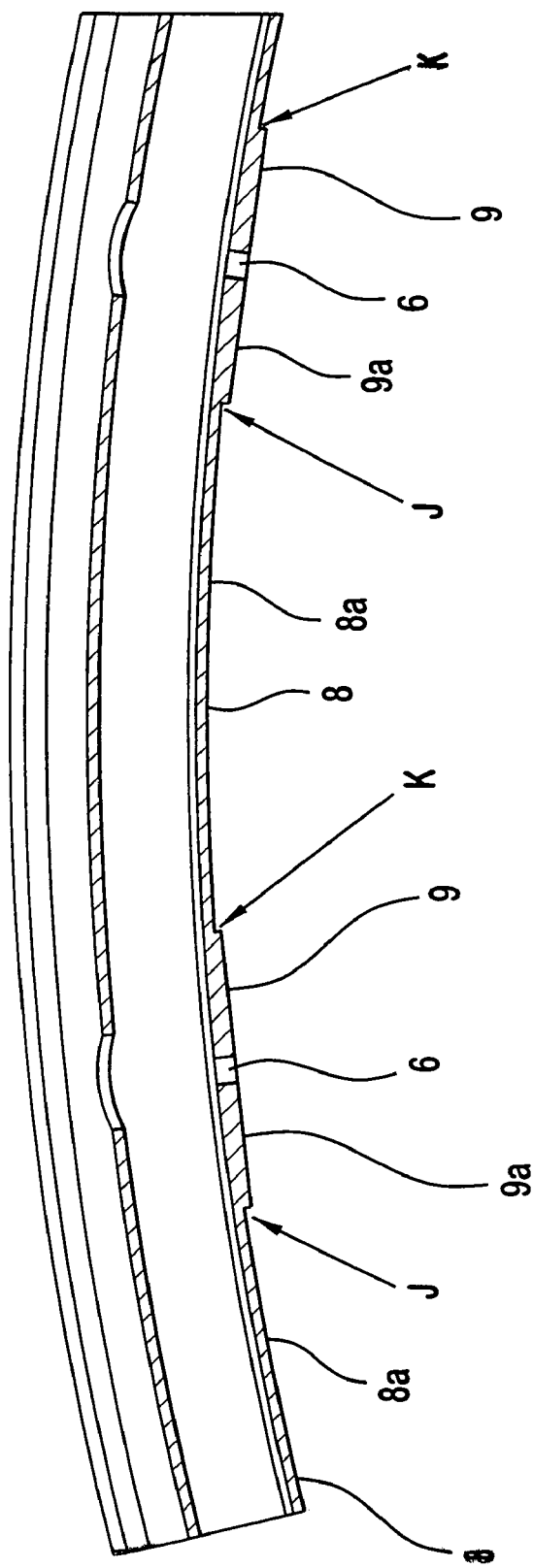
FIG. 5C shows another longitudinal section of a portion of an alternate embodiment of the rim.

As shown in FIG. 5C, the alternating angles J and K extend around the rim 1 on either side of the zones 9. These angles J and K can alternate so that: (1) every other angle J or K is obtuse, and the remaining angles J or K are substantially ninety degrees; (2) every other angle J or K is acute and the remaining angles J or K are substantially ninety degrees; (3) every other angle J or K is acute, and the remaining angles J or K are obtuse; or (4) combinations thereof.

Figure 6:
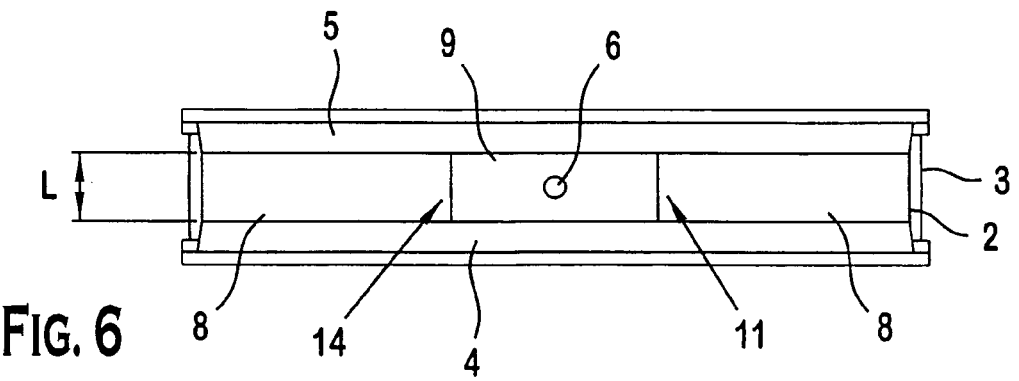
FIG. 6 shows a view from below of the segment of the rim.

FIG. 6 shows a bottom view of the segment of rim 1 of FIG. 1 that emphasizes the "shape" or progression, along the width L of the lower bridge 2, of the increase in thickness between the infra-spoke zone 8 and the spoke attachment zone 9 and of the decrease in thickness between the spoke attachment zone 9 and the infra-spoke zone 8. The progressions are preferably equidistant from the spoke attachment hole 6 and extend along rectilinear portions perpendicular to the side surfaces 4, 5 of the rim 1. In different embodiments, not shown, such rectilinear portions can be tilted by the same angle or by different angles with respect to the side surfaces 4 and 5 in order to satisfy particular aesthetic or functional requirements.

Figure 7:
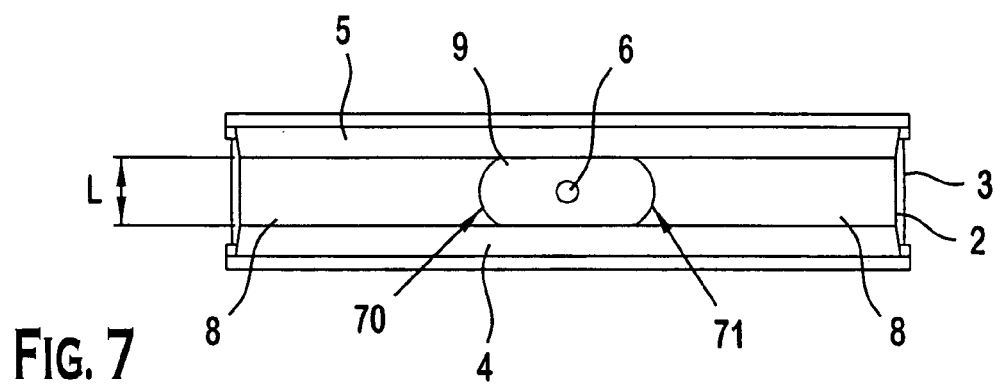
FIG. 7 shows an alternate embodiment of FIG. 6.
Figure 7A:
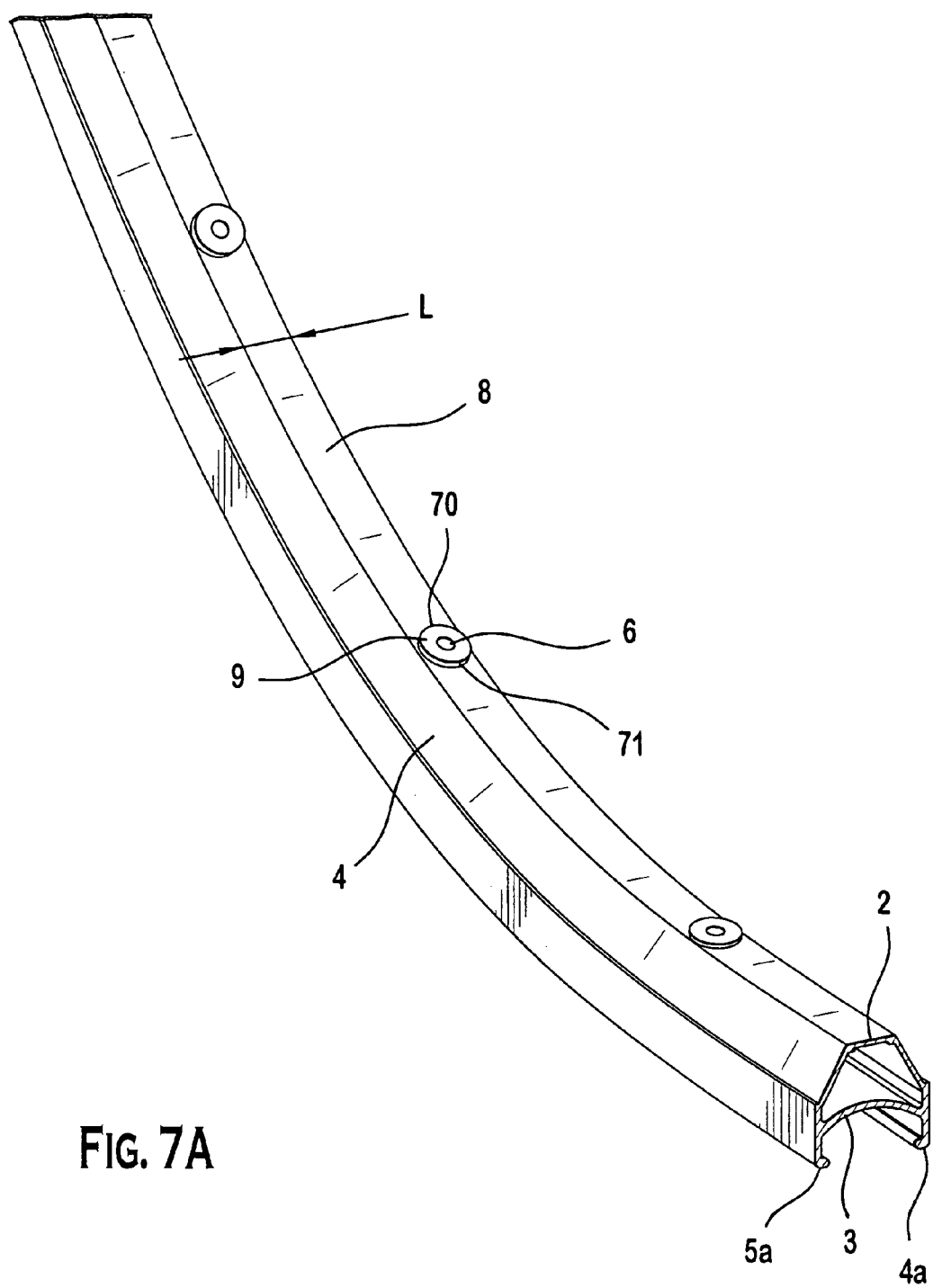
FIG. 7A shows an isometric alternate embodiment of FIG. 7.

FIG. 7 shows the segment of the rim in which the progressions of the variations in thickness 70 and 71, along the width L of the lower bridge 2, are symmetrical with respect to the hole 6 and consist of an arc of circumference with concavity facing towards the hole 6 itself. In a related alternative embodiment the arcs of circle can be moved closer to each other until a single circle is defined around the hole 6 as shown in FIG. 7A.

Figure 8:
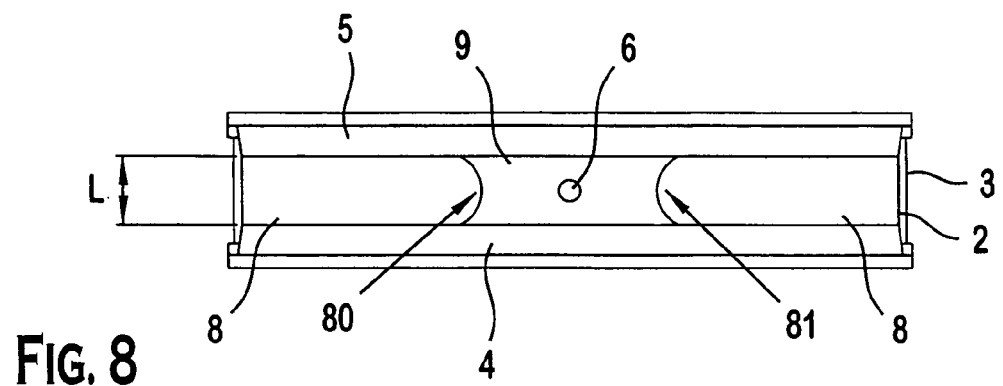
FIG. 8 shows another alternate embodiment of FIG. 6.

FIG. 8 shows the segment of the rim in which the progressions of the variations in thickness 80 and 81, along the width L of the lower bridge 2, are symmetrical with respect to the hole 6 and consist of arcs of circumference with concavity facing towards the infra-spoke zones 8.

The progressions 14, 11; 70, 71 and 80, 81 of the variations in thickness can have different shapes from those shown. For example, they may not be symmetrical, or else the curvilinear portions could be elliptical or parabolic or else be formed by any combination of rectilinear and curvilinear portions.

In the examples described, moreover, the variations in thickness with sharp progressions, that is, not gradual along the inner circumference of the rim, and corners extend for the whole width L of the lower bridge 2. In different embodiments, such variations could extend for a part of the width L of the lower bridge 2, although portions thereof could have a curvilinear or rectilinear gradual progression, as shown in FIGS. 3 and 4.

FIG. 9 shows a wheel W having the characteristics described above and shown in FIGS. 1 to 8. The wheel W has sixteen spokes 19 equally distributed along the circular extension of the lower bridge 2 and connected thereto at respective spoke attachment zones 9. Similarly, FIG. 10 shows another wheel W' having the characteristics described above and shown in FIGS. 1 to 8, in which seven attachment zones 9' are defined for twenty-one spokes 19' grouped in triads defining seven triplets of spokes.

FIGS. 11, 12, and 13 show a method for manufacturing the rim described above. When using the method, material is removed from a rim by means of machine tools driven of one or more moving axes.

The rim on which the removal is carried out may consist of any material, although due to weight considerations aluminum and its alloys or composite materials consisting of structural fibers incorporated in a matrix of polymeric material, such as carbon fiber are preferred.

FIG. 11 shows a portion of the rim 100 obtained of a known technique in which the lower bridge 102 has substantially constant thickness S2 corresponding to the desired final thickness for the spoke attachment zones. In the rim 100 the spoke attachment holes 106 are formed, for example, through drilling. The holes 106 could also be formed after the steps discussed below.

The method uses a rotary tool U1 shown enlarged in FIG. 14. The rotary tool U1 comprises an end milling cutter with a cylindrical head T1 equipped with cutting edges. Such a head T1 has a sharp edge profile with a sharp edge having an industrially achievable radiused angle, i.e. having a radius of curvature in the order of about 0.4 mm or more preferably about 0.2 mm.

In forming the spoke attachment and infra-spoke zones, the rotary milling cutter U1 shown in FIG. 11 is placed with its rotational axis X1 in a substantially radial position to the rim 100.

As it can be seen in FIG. 12, the milling cutter U1 is moved in the radial direction along the axis X towards the rim 100 removing the material of the lower bridge 102 for a depth equal to the value given by the difference in thicknesses S2 and S1. The milling cutter U1 is then moved along an arc of circumference from the starting position of FIG. 12 to the end position of FIG. 13 removing the material from the lower bridge 102 through the cutting edges arranged on the side surface of the head T1. The milling cutter U1 is then retracted towards the centre of the rim 100 and rotated towards a subsequent infra-spoke position for the subsequent removal of material along the lower bridge 102. (In another embodiment of the method, the rim 100 is moved with respect to the rotary milling cutter U1.)

Through the just described method, variations in thickness are obtained in the lower bridge having the shape shown in FIG. 1. Moreover, if the diameter D of the milling cutter U1 is greater than the width L of the lower bridge 102, a rim is obtained with variations in thickness along the width L of the lower bridge with the single step and having a shape shown in FIG. 8.

By controlling the advancing depth of the tool along the axis X towards the lower bridge 102 it is possible to manufacture rims with different combinations of thicknesses S1, S2; S3, S4 and S5, S6, as described with reference to FIGS. 1A, 1B and 1C.

To obtain a different shape of the variations in thickness along the width L of the lower bridge 2, for example like those of FIGS. 6 and 7, the milling cutter U1 is moved along other axes using known techniques of interpolation of the axes. For example, to obtain the progressions 14 and 11 of FIG. 6, the milling cutter U1 must also be moved perpendicular to its axis. With reference to the position of FIG. 12, the milling cutter U1 must, indeed, be translated with alternating movement in the direction perpendicular its axis. To obtain the progressions 70 and 71 of FIG. 7 from the position represented in FIG. 12, the milling cutter U1 must be moved simultaneously along the axis perpendicular to the plane of the rim and along an arc of circumference on the plane of the rim, with alternating progression with a curved interpolated trajectory.

By using a milling cutter U2 with a bevelled frusto-conical cutting head T2 of the type shown in FIG. 15, it is possible to obtain a rim with variations in thickness having the 60° undercut of the type shown in FIG. 5A. To obtain the undercut, the milling cutter U2 is initially arranged with its axis X2 parallel to the plane of the rim but in lateral and outer position. Then, the milling cutter U2 is translated towards the rim keeping its axis parallel to the plane of the rim and the cutting side surfaces of the head T2 removes the material. The milling cutter U2 is then moved along an arc of circumference from the starting position to the end position by removing the material from the lower bridge through the cutting edges placed on the side surface of the head T2. The milling cutter U2 is then extracted laterally with respect to the plane of the rim creating the desired undercut.

Similarly, FIG. 16 shows the milling cutter U3 having the axis X3 and the head T3 that is used to cut the obtuse 120° cut shown in FIG. 5B.

Variations in thickness like those described for the lower bridge can also be obtained on the side walls of the rim; all that is needed are the tools T1, T2, or T3 be moved on planes perpendicular to such walls.

A second processing method used to manufacture the described rim requires the use of the technique of electron discharge machining. In such a case, starting from a rim 100 of the type described and shown in FIG. 11, subsequent operations of removal of material are carried out in the infra-spoke zones through high precision electron discharge machining.

Other methods can be used to obtain the described geometries taking into account the technology and the material used to manufacture the rim itself. In particular, should the rim be obtained by molding, it may be useful to form the desired sections and profiles directly by changing the shape of the mold. In the case, for example, of rims manufactured with layers of carbon fiber, the spoke attachment zones can be obtained through the application in such zones of a number of carbon fibers layers greater than in the infra-spoke zones and the mould also has a shape matching and corresponding to the sharp edge profiles of the zones.

In a similar way, the rim can be obtained using an injection molding technique in which the shape of the mold with sharp edge profiles allows the zones to be obtained when the injected material fills up the cavity with corners defined by it.

Although the rim described herein comprises a lower bridge 2 and upper bridge 3, commonly referred to as "double bridge", such a rim can also be applied to rims with open section, i.e. without an upper bridge, with a substantially U-shaped cross-section.

The section of the rim 1 has a single spoke attachment chamber 15 but two or more chambers can be provided in different embodiments obtained through one or more partition walls that extend parallel or transversely to the upper bridge. Each wall ( upper bridge, lower bridge, side walls and partition walls), moreover, can be shaped in various ways, obtaining a cross-section of the rim that can be substantially complex.

What is claimed is:

1. A rim for a bicycle wheel formed of an annular profile, the section of which comprises a lower bridge and side walls, the lower bridge or the side walls comprising:

spoke attachment zones of a thickness with seats arranged for the attachment of spokes;

infra-spoke zones of a thickness less than the thickness of the spoke attachment zones, the infra-spoke zones are located between the spoke attachment zones; and first portions of the rim that join the infra-spoke zones to the spoke attachment zones and span the difference in thickness between the infra-spoke zones and the spoke attachment zones, said first portions having a sharp progression between the spoke attachment zone and the infra-spoke zone;

wherein the spoke attachment zones and the infra-spoke zones are located along the lower bridge;

wherein the difference in thickness is present on the whole width of the lower bridge.

2. The rim of claim 1 wherein the first portions are aligned substantially radially with respect to the rim.

3. The rim of claim 1 wherein the first portions are inclined with respect to the radial direction of the rim.

4. The rim of claim 1 further comprising second portions located on the surface of the infra-spoke zones, said second portions intersecting the first portions to form angles.

5. The rim of claim 4 wherein the angles form a jointing zone having a radius of curvature equal to or less than 0.4 mm.

6. The rim of claim 4 wherein the angles form a jointing zone having a radius of curvature equal to or less than 0.2 mm.

7. The rim of claim 4 wherein the first portion or the second portion is rectilinear.

8. The rim of claim 4 wherein the first portions or the second portions are curvilinear.

9. The rim of claim 4 wherein the second portions are curvilinear with a radius of curvature substantially equal to the radius of the lower bridge of the rim and the first portions are rectilinear.

10. The rim of claim 4 wherein the angles are acute.

11. The rim of claim 4 wherein the angles are substantially ninety degrees.

12. The rim of claim 4 where in the angles are obtuse.

13. The rim of claim 4 where in every other angle is obtuse, and the remaining angles are substantially ninety degrees.

14. The rim of claim 4 wherein every other angle is acute and the remaining angles are substantially ninety degrees.

15. The rim of claim 4 wherein every other angle is acute, and the remaining angles are obtuse.

16. The rim of claim 4 wherein each of every other first portion is larger than each of the remaining first portions.

17. The rim of claim 1 wherein the difference in thickness extends along the width of the lower bridge in a substantially straight line.

18. The rim of claim 17 wherein the first portions are substantially perpendicular to the side walls of the rim.

19. The rim of claim 17 wherein the first portions are inclined with respect to the side walls of the rim.

20. The rim of claim 1 further comprising an upper bridge with an annular extension connected to the side walls that defines, with the side walls and the lower bridge, at least one chamber for the attachment of the spokes.

21. The rim of claim 1 wherein the infra-spoke zones with reduced thickness are obtained through removal of material with machine tools.

22. The rim of claim 21 wherein the machine tools are milling cutters.

23. A rim for a bicycle wheel formed of an annular profile, the section of which comprises a lower bridge and side walls, the lower bridge or the side walls comprising:

spoke attachment zones of a thickness with seats arranged for the attachment of spokes;

infra-spoke zones of a thickness less than the thickness of the spoke attachment zones, the infra-spoke zones are located between the spoke attachment zones; and first portions of the rim that join the infra-spoke zones to the spoke attachment zones and span the difference in thickness between the infra-spoke zones and the spoke attachment zones, said first portions having a sharp progression between the spoke attachment zone and the infra-spoke zone;

wherein the spoke attachment zones and the infra-spoke zones are located along the lower bridge;

wherein the difference in thickness extends along the width of the lower bridge in a substantially curved line.

24. The rim of claim 23 wherein the curvilinear portions are concave with respect to the seat.

25. The rim of claim 23 wherein the curvilinear portions are convex with respect to the seat.

* * * * *

UNITED STATES PATENT AND TRADEMARK OFFICE
CERTIFICATE OF CORRECTION

| | | |
|---|---|---|
| PATENT NO. | : 7,140,695 B2 | Page 1 of 1 |
| APPLICATION NO. | : 10/877024 | |
| DATED | : November 28, 2006 | |
| INVENTOR(S) | : Maurizio Passarotto | |

It is certified that error appears in the above-identified patent and that said Letters Patent is hereby corrected as shown below:

IN THE SPECIFICATIONS
In column 1 Line 34, after "the" delete "(".
In column 4, Line 22, delete "radium" and insert --radius--, therefor.
In column 7, Line 26, after "perpendicular" insert --to--.

IN THE CLAIMS
Column 9 Line No.1, In claim 12, after "claim 4" delete "where in" and insert --wherein--, therefor.
Column 9 Line No.2, In claim 13, after "claim 4" delete "where in" and insert --wherein--' therefor.

Signed and Sealed this

Fifteenth Day of May, 2007

JON W. DUDAS
*Director of the United States Patent and Trademark Office*